United States Patent [19]

Hayner

[11] 3,912,222
[45] Oct. 14, 1975

[54] LOW FRICTION PISTON TYPE PILOT REQUIRING NO DITHER
[75] Inventor: Paul F. Hayner, Gilford, N.H.
[73] Assignee: Sanders Associates, Inc., Nashua, N.H.
[22] Filed: Apr. 29, 1974
[21] Appl. No.: 465,197

[52] U.S. Cl. ............ 251/282; 308/5 V; 137/625.69
[51] Int. Cl.² .......................................... F16K 39/04
[58] Field of Search ............... 137/625.69; 308/5 V; 251/282

[56] References Cited
UNITED STATES PATENTS

| | | | |
|---|---|---|---|
| 3,012,575 | 12/1961 | Woody et al. | 137/625.62 |
| 3,067,979 | 12/1962 | Cox | 251/287 |
| 3,260,501 | 7/1966 | Raymond | 251/282 |
| 3,370,613 | 2/1968 | Weaver | 137/625.69 |
| 3,581,772 | 6/1971 | Wills | 137/625.69 |

Primary Examiner—Arnold Rosenthal
Attorney, Agent, or Firm—Louis Etlinger; William L. Hunter

[57] ABSTRACT

A low friction cylinder and piston valve system especially suitable for use as the first stage of a multiple stage valve system is described. The piston is provided with two symetrically located hydrostatic bearings one near each end of the piston. Each bearing comprises a land with three symetrically located recesses on the surface which, in conjunction with the interior wall of the cylinder, define three chambers. Each chamber is connected through a restrictor, such as a long slender tube, to a source of fluid under pressure. Fluid flows from the source through the restrictors to each chamber, then through the space between the land and the interior of the cylinder, and finally to the return. Thus three normally equal pressures are established in the three chambers. If the land becomes displaced radially away from its central position, the increase in resistance to flow across the land at the point where the land is closest to the cylinder, will increase the pressure in the adjacent chamber or chambers thereby tending to recenter the land.

2 Claims, 6 Drawing Figures

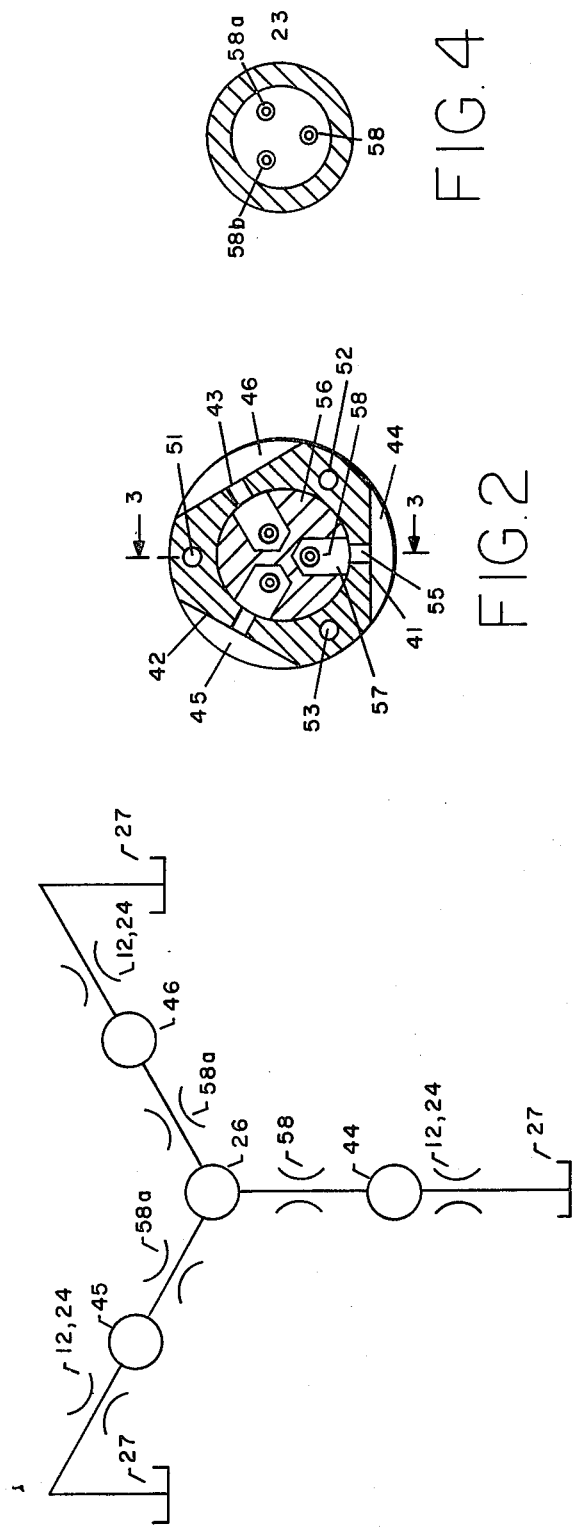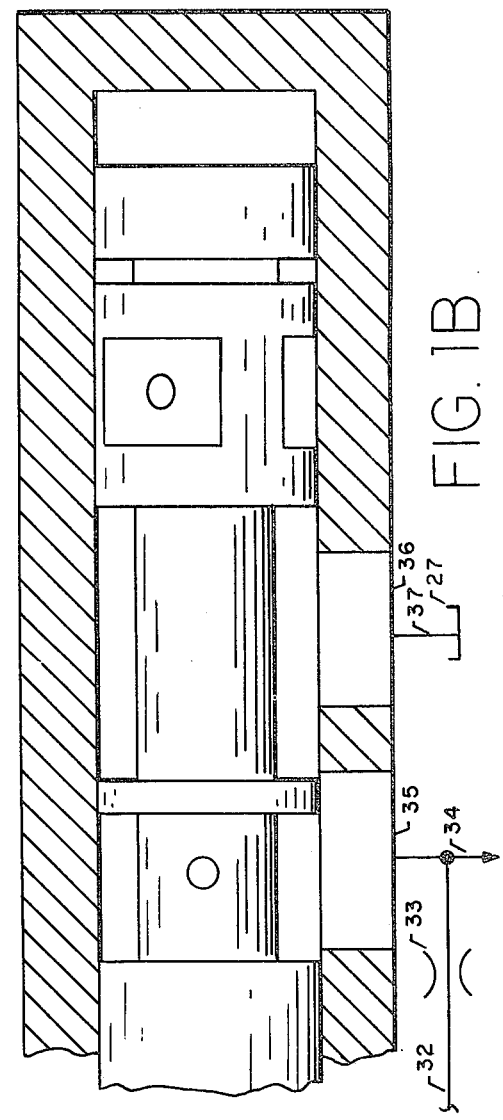

LOW FRICTION PISTON TYPE PILOT REQUIRING NO DITHER

FIELD OF THE INVENTION

This invention relates generally to piston and cylinder valves systems and particularly to such systems which exhibit very low static and dynamic friction and are especially suitable for use as the first stage of a multiple stage valve system.

BACKGROUND

Cylinder and piston valves are widely used not only as main valves which directly control a useful load such as a hydraulic motor, but also as a first, or pilot stage which controls the main valve of a multi-stage valve system. Typically, when used as a first stage, the piston is displaced to one or the other side of a reference or neutral position by the action of an electromagnetic torque motor which in turn is responsive to an electrical input signal. During normal operation, the displacement of the piston from its neutral position to its maximum displacement may be as little as one hundreth of an inch or so and accordingly, to obtain good control, it is necessary to resolve, and resolve quickly, linear displacements measured in thousandths of an inch or even ten thousandths of an inch. Friction between the piston and cylinder, especially static friction, is a large obstacle which must be overcome to attain such good control. In many cases a dither, comprising a low amplitude alternating current signal on the order of from about 60 to about 400 hertz has been superimposed on the input signal to the torque motor in order to keep the piston in constant motion. However, dither requires additional apparatus to generate the necessary signal and also results in vibration of the equipment with the accompanying noise and wear.

SUMMARY OF THE INVENTION

It is a general object of the present invention to provide an improved cylinder and piston valve system.

A more specific object is to provide a cylinder and piston valve system which exhibits very low static and dynamic friction and accordingly is especially suitable for use as the first stage of a multi-stage valve system.

Briefly stated, a cylinder and piston valve incorporating the present invention includes two hydrostatic bearings, formed as part of the piston itself, and preferably located near opposite ends of the piston. Each bearing comprises a generally cylindrical land formed with three recesses symetrically located around the circumference. When disposed within the cylinder, each recess and the interior surface of the cylinder defines a chamber. Each chamber is connected through a first restrictor, such as a long slender tube, to a source of fluid under pressure. The cylinder to either side of the land is connected to the fluid return. A small amount of fluid flows from the source through each restrictor to its chamber and then through the annular space between the land and the cylinder which constitutes a second restrictor and finally to the return. Such fluid flow causes a pressure drop across each restrictor and establishes three normally equal pressures in the three chambers. If the land becomes radially displaced so that one portion is nearer than the rest to the interior of the cylinder, the increase in resistance to fluid flow across the land to the return, causes an increase in the pressure in corresponding chamber or chambers thereby urging the piston back toward the center.

BRIEF DESCRIPTION OF THE DRAWING

FIGS. 1a and 1b taken together are a schematic view of a valve system incorporating the present invention, showing the valve housing in cross section and the piston in elevation;

FIG. 2 is a fragmentary cross section view taken on the line 2—2 of FIG. 1a;

FIG. 4 is a fragmentary cross section view taken on the line 4—4 of FIG. 1a; and FIG. 5 is a schematic diagram useful in explaining the invention.

DESCRIPTION OF PREFERRED EMBODIMENT

Figure 1A:
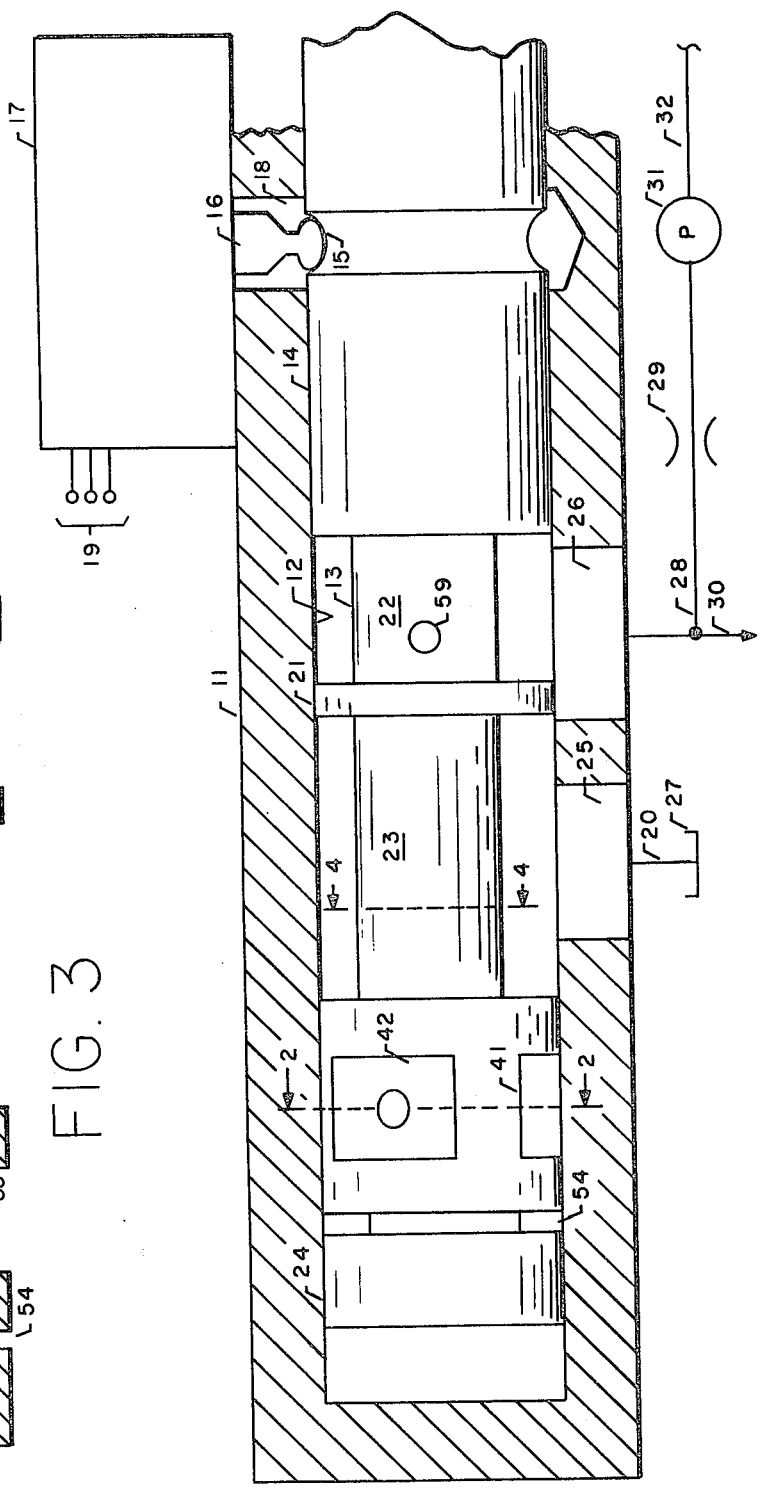

Referring first to FIGS. 1a and 1b, there is shown a housing 11 supporting and enclosing the working parts of the invention. Housing 11 is intended to be a general term including such things as a valve block, a sleeve if such be used, end caps, manifolds and the like. Since the details of these parts are not a part of the present invention, they have been lumped together under the expression housing and under the reference character 11. The housing is formed to define a hollow cylinder 12 in which a generally cylindrical piston, referred to in its entirety by the reference character 13, is disposed. Piston 13 includes a central land 14 formed with a centrally located annular groove 15 which cooperates with the actuating arm 16 of a torque motor 17. The torque motor 17 is mounted on the housing 11 and the arm 16 extends through a passageway 18 to the groove 15. The torque motor includes a group of input terminals 19 to which, during operation, an input signal is applied. The torque motor is a well known kind in which the arm 16 assumes a neutral position in the absence of an input signal but which is displaced in a direction and by an amount determined by the sense and magnitude of the input signal. The valve as a whole is symmetrical about the groove 15 and only the left hand portion, as viewed in FIGS. 1a and 1b, will be described in detail.

A narrow land 21 is joined to the land 14 by means of a reduced diameter portion 22. Another reduced diameter portion 23 joins the land 21 to a land 24 containing a hydrostatic bearing. The housing 11 is formed to define a passageway 25 constituting a return connection providing communication between the cylinder 12 in the region between the lands 21 and 24 and the outside of the housing. A conduit 20 joins the return connection to the fluid return 27. The housing 11 is also formed to define a passageway 26 constituting a fluid pressure connection. As shown, the connection 26 communicates freely with the cylinder 12 in the region between the lands 21 and 14 but, together with the land 21, defines a more restricted passageway between the connection 26 and the cylinder in the region between the lands 21 and 24. An outlet conduit 20 is connected to the fluid pressure connection 26 and is also connected to a conduit 28 which in turn is connected, through a restrictor 29, to a source 31 of fluid under pressure. A conduit 32 connects the source 31 through a restrictor 33 (see FIG. 1b) to another outlet conduit 34 which is also connected to another fluid pressure connection 35 complimentary to the connection 26.

Similarly, another return connection 36, which is complimentary to the connection 25, is connected through a conduit 37 to the return 27.

Returning to FIG. 1a, the land 24 is formed with three recesses of which the recesses 41 and 42 are shown in FIG. 1a while these and the recess 43 are all shown in FIG. 2. The three recesses are symmetrically located about the circumference of the land 24 and are axially positioned inwardly from the edge, as shown in FIG. 1a. These recesses may be of any shape provided all three are the same. As best shown in FIG. 2, each recess is preferably formed as a flat spot on the land. Whatever the shape, these recesses and the interior surface of the cylinder 12 define three substantially identical chambers 44, 45 and 46.

Figure 3:
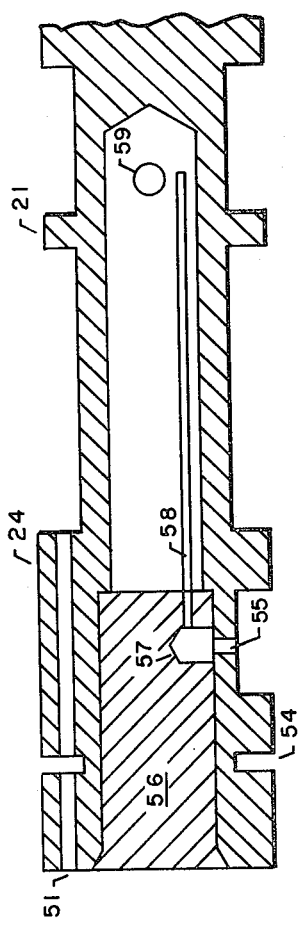
FIG. 3 is a fragmentary cross section view taken on the line 3—3 of the FIG. 2.

As best shown in FIGS. 2 and 3, the piston 13 is hollow from the left end, as shown in the drawing, to the region between the lands 21 and 14. The rim of the land 24 between the chambers is formed with three longitudinally extending passageways 51, 52 and 53 which extend parallel to the axis completely through the land in order to provide communication between the return connection 25 and the left end of the land 24 and also to an annular groove 54. This groove is formed in the periphery of the land between its left end and the chambers 41, 42 and 43. The land 24 is also formed with three radial passageways, of which the passageway 55 is typical, each providing communication between one of the chambers and the interior hollow portion of the land 24. The hollow interior portion of the land 24 is substantially filled with a generally cylindrical plug 56 which is provided with three radial passageways, of which passageway 57 is typical, each communicating with one of the previously mentioned radial passageways such as the passageway 55. The three passageways in the plug, of which passageway 57 is typical, extend from the cylindrical surface of the plug inwardly but do not join each other. The plug 56 is also formed with three longitudinal holes or passageways extending parallel to the axis, one from each of the radial passageways in the plug to the right as viewed in FIG. 3 all the way through the right face of the plug 56 so that each communicates with the hollow interior portion of the piston 13. These passageways are obscurred in the drawing because an elongated hypodermic needle tube, such as the tube 58 fills these passageways. The tubes make a press fit with these passageways and extend from the radial passageways such as the passageway 57 to the right and outside of the plug 56, through the hollow interior portion of the piston 13 to a point to the right of the land 21, as viewed in FIG. 3. As best shown in this figure, the hollow portion of the piston 13 ends just to the left of the land 14. The hypodermic needle tubes are all open at their ends so that they communicate with a radial passageway such as the passageway 57 in the plug 56 on one end and are in free communication with the hollow interior portion of the piston 13 at the other end. A radial passageway 59 is formed in the reduced diameter portion 22 in order to provide communication between the fluid pressure connection 26 and the hollow interior portion of the piston 13 which portion contains the three tubes. A similar passageway may be formed diametrically opposite the passageway 59.

Considering now the operation, in the absence of an input signal the parts will be in the positions shown in the drawing. Fluid from the source 31 will flow through restrictor 29 and the conduits 28 and 30 to the fluid pressure connection 26 and then across the land 21 through the small space defined by this land and the housing 11 to the return connection 25, the conduit 26 and the return 20. Such flow causes a pressure drop across the restrictor 29 and another pressure drop across the land 21 thereby establishing a potential in the outlet conduit 30 which is less than the pressure of the source 31 but greater than the pressure of the return 27. A similar flow occurs through the apparatus shown in FIG. 1b thereby establishing a similar potential in the outlet conduit 34. The apparatus is adjusted so that, in the absence of an input signal, the pressures in the conduits 30 and 34 are equal. An input signal applied to the terminals 19 will cause the arm 16 of the torque motor 17 to displace the piston 13 in a direction and an amount determined by the sense and magnitude of the input signal. For illustrative purposes, let us assume that the piston 13 is displaced slightly to the left. Such motion will increase the resistance to flow across the land 21 and decrease the resistance to flow across the complimentary land shown in FIG. 1b thereby increasing the pressure in the conduit 30 and decreasing the pressure in the conduit 34. Such pressure differential may be utilized to control other apparatus, such as a main valve (not shown).

The two hydrostatic bearings hold the piston centered. As shown schematically in FIG. 5, fluid from the pressure connection 26 flows into the passageway 59 to the interior of the piston 13 and then into the right hand ends of the hypodermic needle tubes 58, 58a and 58b each of which constitutes a restrictor and is shown as such in FIG. 5. From these tubes, the fluid flows to the chambers 44, 45, and 46 and then across the cylindrical surface of the land 24 between this surface and the interior of the cylinder 12 in both directions, that is to the left as shown in FIG. 1a to the annular groove 54 and to the right to the space surrounding the reduced diameter portion 23. These spaces constitute restrictors and have been shown schematically as such in FIG. 5. The groove 54 is hydraulically connected, by means of the longitudinal passageways 51, 52 and 53 with the space surrounding the reduced diameter portion 23 which in turn is in communication with the return connection 25. The chambers 44, 45 and 46 are made to be identical within reasonable manufacturing tolerances and similarly the tubes 58, 58a and 58b are also identical to each other. The pressure at the fluid pressure connection 26 is the same for all three flow paths shown in FIG. 5 and the pressure of the return is also the same for all three paths. If the three restrictors comprised of the space between the land 24 and the cylinder 12 are also identical, then the pressure in each of the chambers 44, 45 and 46 will likewise be identical and since they are spaced evenly around the circumference of the land 24, the land will be held in the center of the cylinder 12. It is to be noted that the three restrictors formed by the surface of the land 24 and the interior of the cylinder 12 can only be identical when the land 24 is centered in the cylinder 12. If for some reason the piston 13 and the land 24 should be displaced from the center in such a direction so that the chamber 44, for example, is closer to the cylinder wall than the remaining chambers, then the flow of fluid from this chamber across the portion of the land 24 adjacent thereto will be further restricted thereby raising the pressure in the chamber 44. Such increase in pressure, relative to the pressure in the chambers 45 and 46 will urge the land 24 back to a central position where the pressure in all of the chambers will again be the same. The bearing on the opposite end of the piston 13 acts in a similar manner to keep that end of the piston centered within the cylinder 12.

It has been found that a valve system constructed in accordance with the present invention exhibits such little friction that the use of dither is entirely unnecessary and that great precision of control can be achieved.

Although a preferred embodiment of the invention has been described in considerable detail for illustrative purposes, many modifications will occur to those skilled in the art. It is therefore desired that the protection afforded by Letters Patent be limited only by the true scope of the appended claims.

I claim:

1. A valve system comprising a valve housing formed to define a hollow cylinder and a plurality of passageways providing fluid communication between said cylinder and the exterior of said housing, said passageways including a fluid pressure connection and a fluid return connection, a piston disposed within said cylinder and formed with a plurality of lands cooperating with said passageways to control the flow of fluid therebetween as said piston is displaced axially with respect to said cylinder, and means responsive to an input signal for controlling the axial position of said piston, characterized in that said system includes first and second hydrostatic bearings on opposite sides of the center of said piston, each of said bearings comprising a generally cylindrical land formed with three identical recesses on the surface thereof symmetrically located around the circumference, which recesses together with the interior surface of said cylinder define three chambers, three fluid restrictors each connected to provide restricted fluid communication between one of said chambers and said fluid pressure connection, means providing fluid communication between said fluid return connection and the interior of said cylinder at opposite ends of said generally cylindrical land, said generally cylindrical land being hollow and being formed with three generally radial passageways each providing communication between one of said recesses and the interior of said land, and a generally cylindrical plug substantially filling the hollow portion of said generally cylindrical land and formed with three radial passageways each communicating with one of said passageways in said generally cylindrical land and also formed with three longitudinal passageways each communicating with one of said radial passageways and each extending through one face thereof, each of said restrictors being a slender tube having a length many times its diameter, said tubes being in communication with and supported by said longitudinal passageways and extending beyond said face of said plug.

2. A valve system in accordance with claim 1 in which the portion of said piston adjacent to said generally cylindrical land is hollow and surrounds said slender tubes.

* * * * *